Patented May 14, 1929.

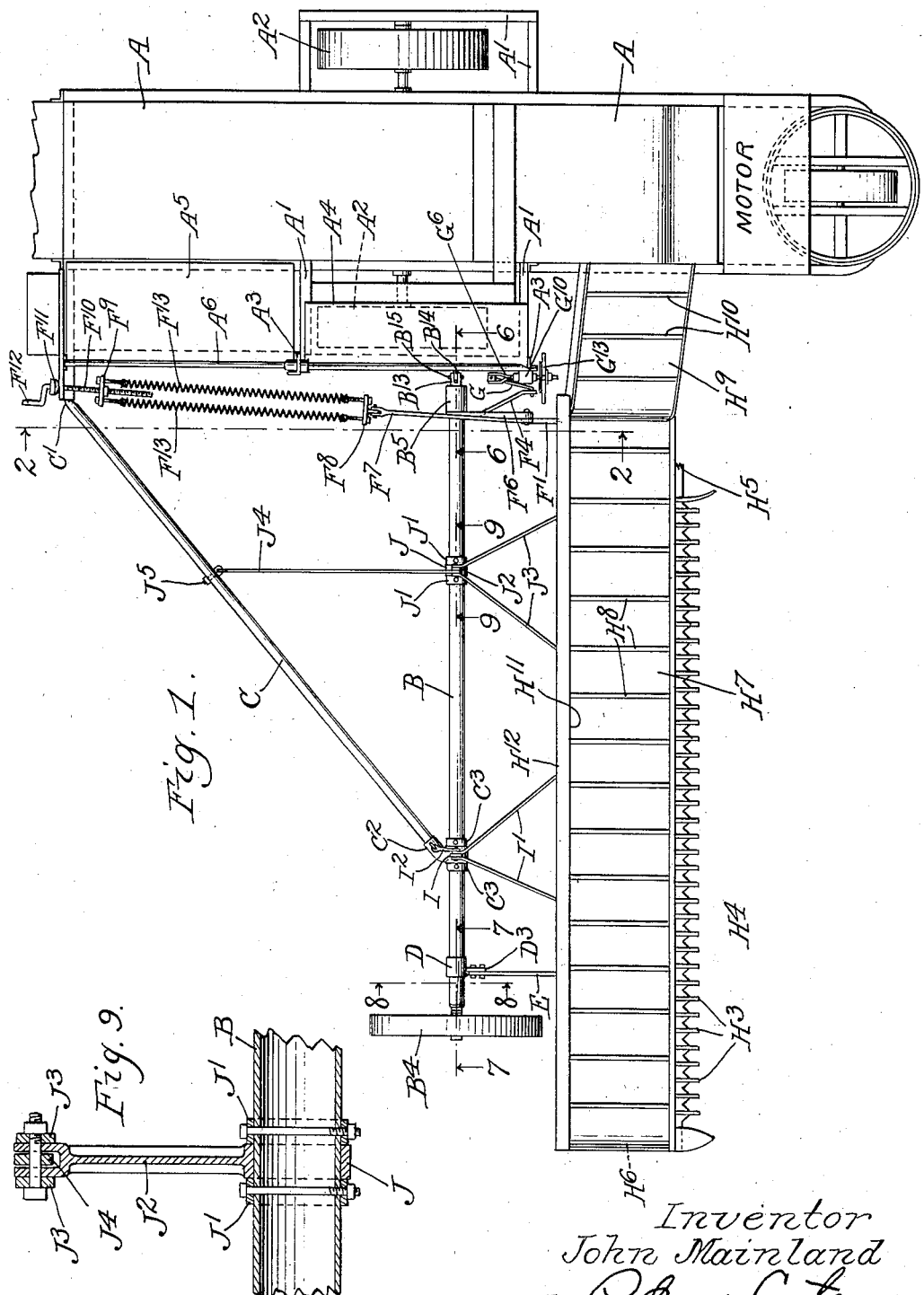

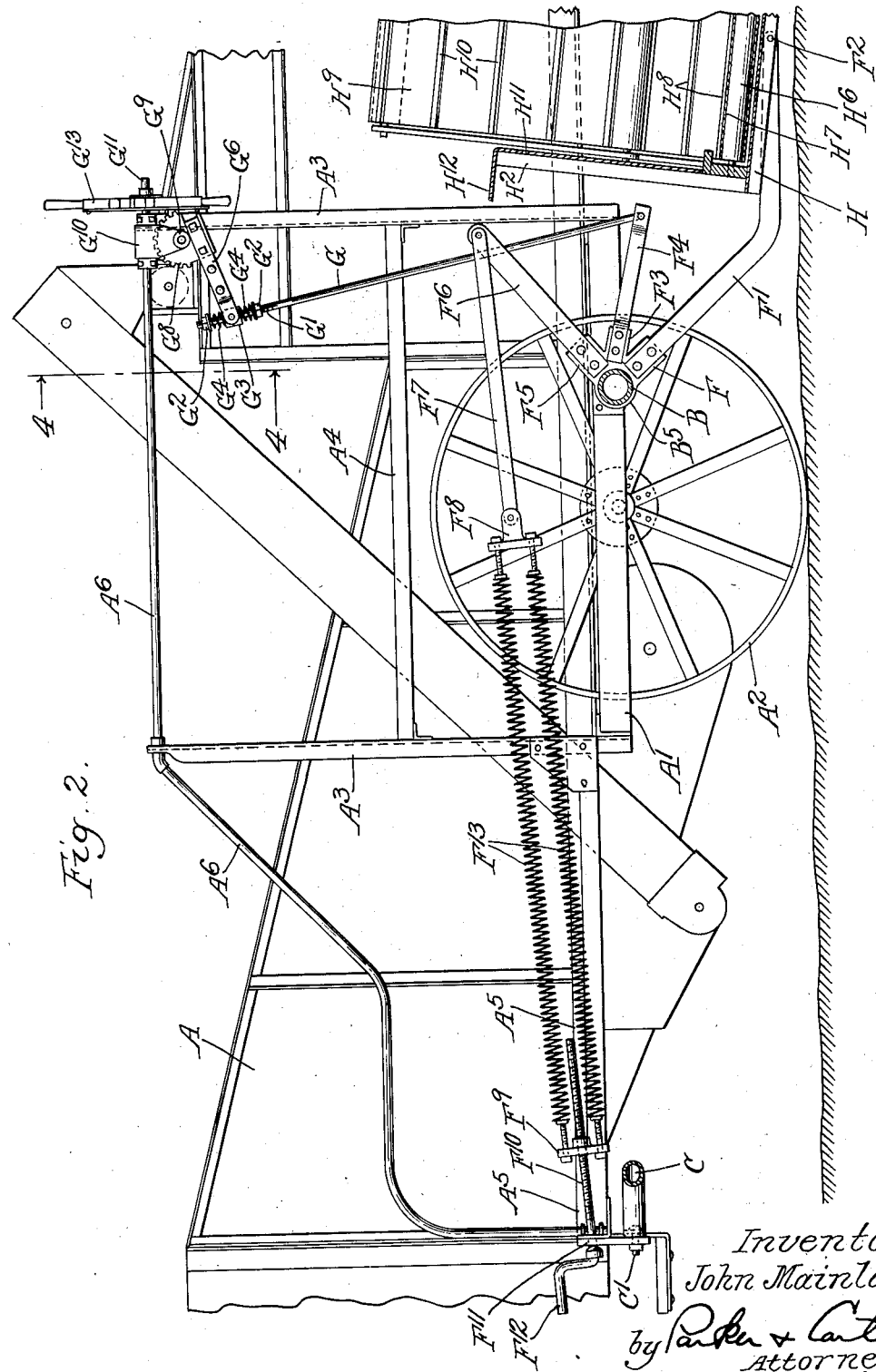

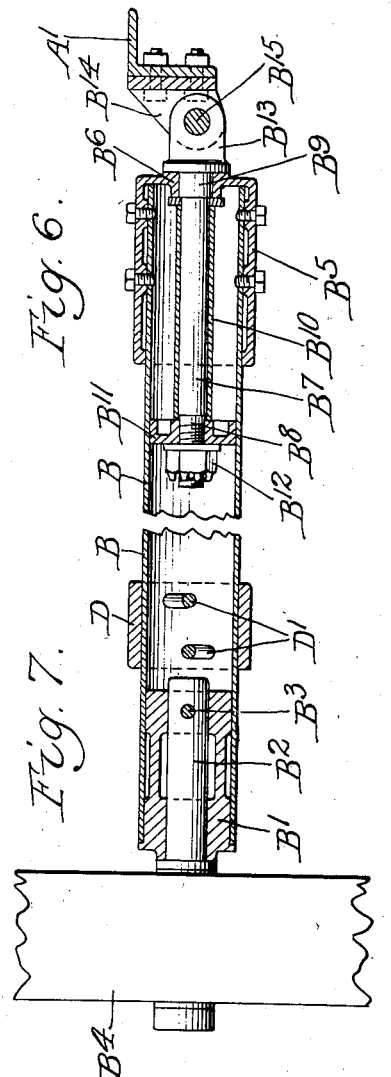
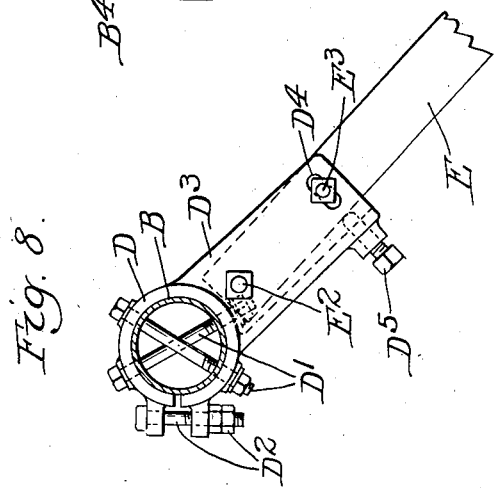
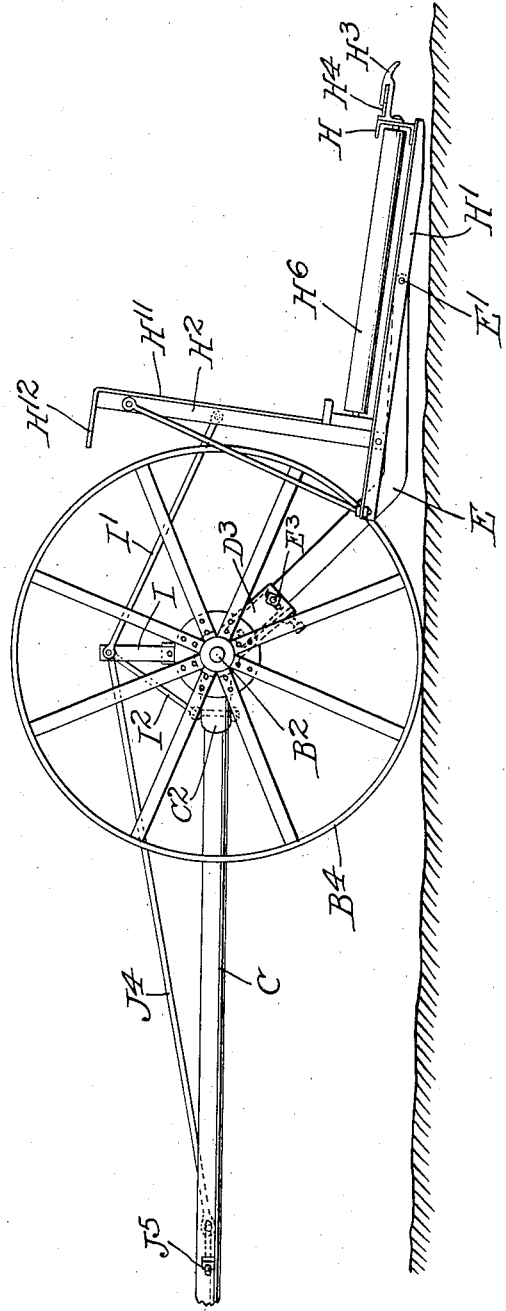
Inventor
John Mainland
by Parker & Carter
Attorneys.

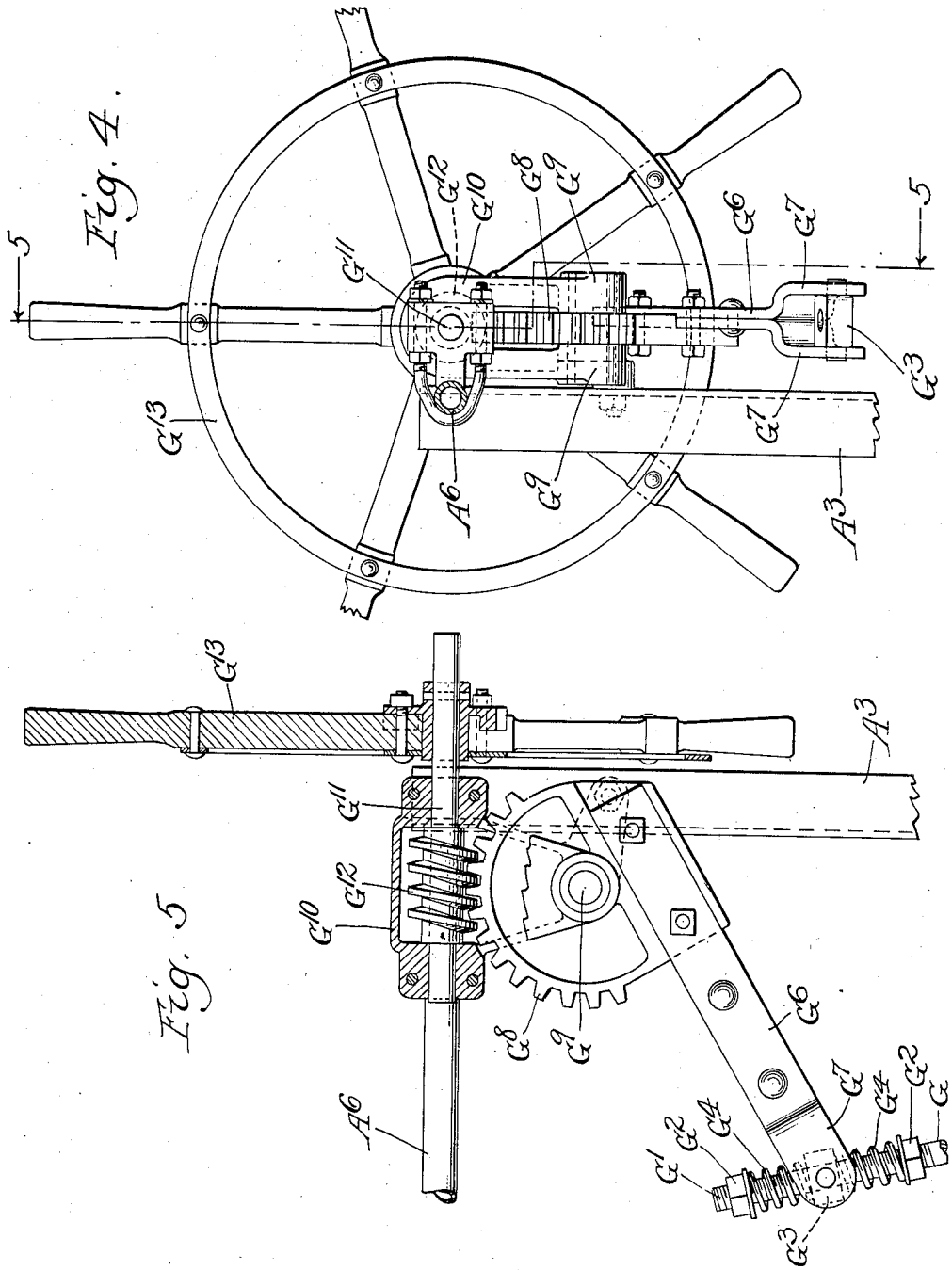

1,713,291

UNITED STATES PATENT OFFICE.

JOHN MAINLAND, OF LA PORTE, INDIANA, ASSIGNOR TO ADVANCE-RUMELY COMPANY, OF LA PORTE, INDIANA, A CORPORATION OF INDIANA.

HARVESTER THRASHER.

Application filed July 9, 1927. Serial No. 204,448.

This invention relates to a grain cutting and handling device and particularly to a device of the type which may be used in connection with thrashers or separators to cut the grain as it stands in the field. One object of the invention is to provide a device in which the cutter attachment which is usually called a "header" may be used to cut a wide variety of growths of different heights and in which it may also be adjusted to provide for the cutting of a greater or less portion of the straw with the grain. Other objects will appear from time to time in the specification and claims.

My invention is illustrated more or less diagrammatically in the accompanying drawings, wherein—

Figure 1 is a plan view of the device in position on a separator;

Figure 2 is a vertical longitudinal cross section on the line 2—2 of Figure 1;

Figure 3 is a side elevation of the header attachment alone;

Figure 4 is an elevational view with parts in section showing a portion of the adjusting mechanism;

Figure 5 is a longitudinal vertical cross section taken on the line 5—5 of Figure 4 with some parts shown in elevation;

Figure 6 is an enlarged cross sectional detail taken on line 6—6 of Figure 1;

Figure 7 is an enlarged cross sectional detail taken on line 7—7 of Figure 1;

Figure 8 is an enlarged cross sectional detail taken on line 8—8 of Figure 1;

Figure 9 is an enlarged cross sectional detail taken on line 9—9 of Figure 1.

Like parts are designated by like characters throughout the specification and drawings.

A represents generally a thrasher or separator. It is provided with frame members $A^1$ $A^1$ in which supporting wheels $A^2$ $A^2$ are mounted for rotation. The frames $A^1$ are provided with vertical extensions $A^3$. Positioned above one of the wheels $A^2$ and carried by the vertical members $A^3$ is a platform $A^4$. This platform is on the left side of the machine as shown in Figure 1. $A^5$ is a lower platform supported from the separator A and positioned in rear of the wheels $A^2$. $A^6$ is a hand rail member of irregular shape positioned along the platforms $A^4$ and $A^5$ and adapted among other things to serve as a hand rail to protect those standing on the platforms. It is supported upon the upper ends of the vertical members $A^3$.

The header itself constitutes generally a frame-work which is movably supported from the side of the separator and includes a sickle bar and one or more conveyers, all of these parts being assembled together to permit vertical adjustment and movement.

B is a hollow tube which serves as a supporting member for the header assembly. In its outer end, it is provided with a filler plug $B^1$. It has formed within it a cavity within which is positioned a bearing rod or short axle $B^2$. It is bolted or pinned in position by means of a member $B^3$. Mounted for rotation on the outer end of the axle $B^2$ is a wheel $B^4$. Surrounding the inner end of the tube B is a housing $B^5$ provided at its innermost end with a bearing portion $B^6$. Within this bearing a short shaft is positioned. The shaft includes a relatively long slender portion $B^7$ which is provided at one end with a reduced threaded portion $B^8$ and at its other with an enlarged portion $B^9$. This latter is mounted for movement within the bearing $B^6$ and $B^{10}$ is a spacing sleeve positioned by the portion $B^7$. $B^{11}$ is a filling bearing block positioned about the reduced threaded portion $B^8$, in contact with one end of the spacing sleeve $B^{10}$ and held in position by the castellated nut $B^{12}$, and providing a bearing surface between its outer edge and the inside of the tube B. The portion $B^9$ of the short axle is provided with a pair of ears $B^{13}$ which are mounted astride a lug $B^{14}$. $B^{15}$ is a pin driven through the ears $B^{13}$ and the lug $B^{14}$ and providing a bearing and support for the tube.

Extending rearwardly from the tube B is a diagonal bracing member C and is fastened to the frame of the separator at $C^1$ and at its forward end it is provided with a bearing collar members $C^2$ which is mounted about the tube B and held against lateral displacement therealong by collars $C^3$ which are fixed on the tube. Fixed adjacent the outer end of the tube B is a split collar D which is held in position by means of bolts $D^1$ $D^1$ and the lock nut and bolt $D^2$. This collar is provided with an extension $D^3$ which has formed in it an adjusting slot $D^4$ and carries a set screw $D^5$.

Projecting forwardly from the extension $D^3$ is a bent member E. This member supports the outer end of the header frame. It is pivoted to the header frame at its forward end at $E^1$. At its rear end it is pivoted at $E^2$ to the extension $D^3$. It is moved into adjusted position by means of the set screw $D^5$ and locked in position by means of the lock nut $E^3$ which may move through a limited arc in the slot $D^4$.

The member $B^5$ which is mounted adjacent the inner end of the tube is provided with a forwardly and downwardly extending channel member F. Positioned within this member F is a bent forwardly extending supporting bar $F^1$ which is pivoted to the header frame at $F^2$. The member $B^5$ is provided also with a channelled extension $F^3$ within which is located an adjusting lever $F^4$. $F^5$ is a third channeled extension on the member $B^5$ and within it is positioned the counter-balancing lever $F^6$; pivotally joined to the lever $F^6$ is a link $F^7$ which carries movably mounted upon it a yoke $F^8$. $F^9$ is a second yoke adjustably carried on the threaded adjusting member $F^{10}$ which is mounted in the separator frame at $F^{11}$ and provided with the adjusting crank handle $F^{12}$ by means of which it may be rotated to cause the yoke $F^9$ to move along it.

$F^{13}$ $F^{13}$ are springs each joined at one end to one side of the yoke $F^8$ $F^9$ and adapted to exert an adjustable tension upon the link $F^7$ and the lever arm $F^6$, thus tending to counterbalance the weight of the header assembly.

G is a rod mounted for movement in the outer end of the lever $F^4$. At its upper end it is provided with a threaded portion $G^1$ and two separated nuts $G^2$ $G^2$ between which there is mounted a collar $G^3$ which is held in cushioned position by means of short helical springs $G^4$ $G^4$ which lie one on each side of the collar $G^3$ and bear against the nuts $G^2$. $G^6$ is an adjusting lever arm provided with a pair of separated ears $G^7$ between which the collar $G^3$ is pivotally mounted. The lever arm $G^6$ is fastened to the adjusting quadrant $G^8$ which is supported from the vertical member $A^3$ in a bearing $G^9$. $G^{10}$ is a bearing housing supported at one end upon the vertical member $A^3$ joined at its other end to the tubular hand rail $A^6$ and carrying within it a shaft $G^{11}$ upon which is fixed a worm $G^{12}$ which engages the quadrant $G^8$. The worm is in fixed relation to the shaft and rotates with it. A hand wheel $G^{13}$ is fixed on the outer end of the shaft $G^{11}$ and by means of it the worm may be rotated so as to move the quadrant and thereby the lever $F^4$ is raised and lowered and the adjusted position of the header correspondingly altered.

The header frame is formed of longitudinal members H and transverse members $H^1$. It is to the latter that the supporting bars $F^1$ and E are pivoted. The header is provided also with vertical frame members $H^2$, forwardly extending fingers $H^3$, and a sickle bar $H^4$. The bar is operated by any suitable mechanism. None is shown here and the bar is broken off as at $H^5$, since the particular operating details of this device form no part of the present invention. Mounted for rotation in the header frame are a plurality of rollers $H^6$ which carry a belt conveyer $H^7$, upon which are positioned slats $H^8$. The driving mechanism for this belt is not shown as it forms no part of the present invention. The belt conveyer $H^7$ is designed to discharge onto a second belt conveyer $H^9$ provided with slats $H^{10}$. This conveyer was designed to discharge into the main feed of the separator so that grain to be thrashed will enter the separator after being discharged from the upper elevating conveyer which takes material from the lower or generally horizontal conveyer on the header. The header frame is provided with a rear wall member $H^{11}$ which extends vertically as shown and may terminate in a laterally bent generally horizontal position $H^{12}$.

Extending vertically from the collar member $C^2$ is a short bracing member I. It is provided with two forwardly extending braces $I^1$ which are joined to the vertical frame parts $H^2$ of the header frame and is provided with a short rearwardly extending brace member $I^2$ which is joined to the rearmost portion of the collar $C^2$.

J is a collar loosely mounted about the tube B, held against lateral displacement by fixed collars $J^1$ and provided with an upward extension $J^2$. It is provided with a pair of forwardly extending braces $J^3$ which are joined to the brace member and it is provided with a relatively longer brace member $J^4$ which is fastened to the diagonal member C at $J^5$.

The adjustment of the member E in the supporting member $D^3$ by means of the nut $D^5$ and the bolt $E^3$ is intended primarily for use when the device is originally assembled. Because of the length of the member B and because of the fact that some flexibility exists in this member, it is necessary to have adjustment of the outer support E with relation to the member B in order to permit of setting the header frame in proper position. A header is positioned toward the front of the separator and may serve to drive the mechanism. The header is indicated diagrammatically in Figure 1. It will be understood that other driving means could be provided without departing from the spirit of my invention.

To make more effective the counter-balancing feature, the lever arm $F^6$ and the springs $F^{13}$ are so proportioned and correlated that the tension or lifting force exerted through the lever $F^6$ on the header frame is substantially equal irrespective of variations in the position of adjustment of the header frame.

As the header frame is raised, for example, from the position shown in Figure 2, the tension of the springs $F^{13}$ is somewhat reduced but the lever $F^6$ assumes a position somewhat more nearly at right-angles to the line of the springs $F^{13}$ and the effective length of this lever arm thus becomes greater as the tension on the springs becomes less. By reason of this construction and the proportioning of the parts, a substantially equal upward pull is applied at all times to the header frame.

The use and operation of my invention are as follows:

The header attachment of this invention is normally assembled in position on a thrashing machine or separator as shown in Figure 2. It is mounted on the forward end of the separator in such position that the entire assembly may be driven forward. The header will cut off the grain, convey it laterally and upwardly and discharge it into the separator at the point where grain is usually received so that it may be thrashed in the usual manner. The header is so mounted on the separator that it can be adjusted and it is also in a generally counter-balanced condition, the weight of the header assembly being largely counter-balanced, if not supported by means of the springs $F^{13}$ and spring and yoke assembly. When it is desired to raise or lower the header, the adjusting wheel $G^{13}$ is operated and through the worm, segment and associated linkage the entire frame is raised. In this operation, the springs $F^{13}$ assist.

Because of the arrangement of parts, the balancing of the header frame, and the spring assembly, it is possible to use a much lighter supporting frame than has heretofore been done. This is due to the face that the normal rearward thrust of the header frame when it is driven forward into the grain is in large part overcome or counter-balanced by balance of the header frame and the forward pull which it, through the springs, imparts to the frame of the separator.

It will be understood that as the device is driven forward into the grain the sickle bar is moved backward and forward so as to cut the grain; the conveyers operate so as to pick up the grain as it falls and move it into the separator and the separator operates in the usual fashion to thrash the grain.

I claim:

1. A header assembly adapted to be attached to other grain treating machines and including a support adapted for attachment to such grain treating machines and a header frame carried from said support in combination with means for holding such frame in counter-balanced relation, an extension from said frame, such holding means adapted to engage said extension from said header frame and a part of such other grain treating machine and adjusting means therefor, and additional means for adjusting the position of such frame, such header frame carrying a grain cutting, and a grain conveying mechanism adapted to convey the cut grain into such other grain treating machine.

2. A header assembly adapted to be attached to other grain treating machines and including a wheeled support adapted for pivotal attachment to such grain treating machines and a header frame adjustably carried from said support in combination with means for holding such frame in counter-balanced relation, a raised extension from said frame, such means adapted to engage said extension from said header frame and a part of such other grain treating machine and adjusting means therefor, such header frame carrying a grain cutting, and a grain conveying mechanism adapted to convey the cut grain into such other grain treating machine.

3. A header assembly adapted to be attached to other grain treating machines and including a wheeled support adapted for pivotal attachment to such grain treating machines and a header frame adjustably carried from said support in combintion with means for holding such frame in counter-balanced relation, a raised extension from said frame, such means adapted to engage said extension from said header frame and a part of such other grain treating machine and adjusting means therefor, and additional means for adjusting the position of such frame, such header frame carrying a grain cutting, and a grain conveying mechanism adapted to convey the cut grain into such other grain treating machine.

4. In combination with a separator a header assembly including a header and a supporting frame therefor, the header being movably supported therefrom, a brace fastened at one end to such frame and the other to a part of the separator frame, a counter balancing means joined, to such header frame at one end, and, at its other end, joined to the separator frame at the point of attachment of said bracing member.

5. In combination with a separator a header assembly including a header and a supporting frame therefor, the header being movably supported therefrom, a brace fastened at one end to such frame and the other to a part of the separator frame, a counter balancing spring, and lever assembly joined to such header frame at one end, and, at its other end, joined to the separator frame at the point of attachment of said bracing member.

6. In combination with a separator a header assembly including a header frame and a supporting frame therefor, the header frame being movably supported therefrom, a rigid brace fastened at one end to such frame and the other to a part of the separator frame, a counter balancing spring, and lever assembly joined, to such header frame at one end, and, at its other end, joined to the separator frame at the point of attachment of said bracing member.

7. In combination with a separator a header assembly including a header and a supporting frame therefor, the header being movably supported therefrom, a brace fastened at one end to such frame and the other to a part of the separator frame, a counter balancing spring, and lever assembly joined, to such header frame at one end, and, at its other end, joined to the separator frame at the point of attachment of said bracing member, the spring and lever so proportioned that together they exert a substantially constant pull on the header irrespective of its position of adjustment.

8. In combination with a separator a header assembly including a header and a supporting frame therefor, the header being movably supported therefrom, a brace fastened at one end to such frame and the other to a part of the separator frame, a counter balancing spring, and lever assembly joined, to such header frame at one end, and, at its other end, joined to the separator frame at the point of attachment of said bracing member, the spring and lever being so proportioned that as the tension of the spring is reduced due to adjustment of the position of the header, the effective length of the lever arm is increased in the same proportion.

9. In combination with a separator a header assembly including a header frame and a supporting frame therefor, the header frame being movably supported therefrom, a rigid brace fastened at one end to such frame and the other to a part of the separator frame, a counter balancing spring, and lever assembly joined, to such header frame at one end, and, at its other end, joined to the separator frame at the point of attachement of said bracing member, the spring and lever so proportioned that together they exert a substantially constant pull on the header irrespective of its position of adjustment.

10. In combination with a separator, a header assembly, including a header frame, and a supporting frame therefor, the header frame being movably supported therefrom, a counterbalancing spring, and lever assembly joined to such header frame at one end and at its other end joined to the separator frame, the spring and lever being so proportioned that in combination they exert a substantially constant pull on the header irrespective of its position of adjustment.

Signed at La Porte county of La Porte and State of Indiana, this 5th day of July, 1927.

JOHN MAINLAND.